United States Patent
Camargo et al.

(10) Patent No.: US 10,440,419 B2
(45) Date of Patent: Oct. 8, 2019

(54) SYNCHRONIZING PRESENTATION OF CONTENT PRESENTED BY MULTIPLE CLIENT DEVICES

(71) Applicant: Facebook, Inc., Menlo Park, CA (US)

(72) Inventors: Rafael Camargo, Monte Sereno, CA (US); Olivier Charles Gratry, Mill Valley, CA (US); Vincent Charles Cheung, San Carlos, CA (US); Connie Yeewei Ho, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 93 days.

(21) Appl. No.: 15/855,200

(22) Filed: Dec. 27, 2017

(65) Prior Publication Data

US 2019/0200072 A1    Jun. 27, 2019

(51) Int. Cl.
G06F 15/173    (2006.01)
H04N 21/43     (2011.01)
H04N 21/24     (2011.01)

(52) U.S. Cl.
CPC ..... *H04N 21/4307* (2013.01); *H04N 21/2402* (2013.01)

(58) Field of Classification Search
USPC ....................................................... 709/224
See application file for complete search history.

(56) References Cited

U.S. PATENT DOCUMENTS

| | | | |
|---|---|---|---|
| 6,801,939 B1 * | 10/2004 | Chafe ..................... | H04L 41/12 370/252 |
| 2008/0101253 A1 * | 5/2008 | Shvodian .............. | H04J 3/0682 370/252 |
| 2008/0304573 A1 * | 12/2008 | Moss ................. | H04N 21/2368 375/240.28 |
| 2011/0202966 A1 * | 8/2011 | Gupta .................... | H04N 7/173 725/114 |
| 2015/0382050 A1 * | 12/2015 | Le Nerriec ............. | H04L 45/16 725/80 |
| 2017/0034237 A1 * | 2/2017 | Silver ................... | H04L 65/604 |
| 2017/0181113 A1 * | 6/2017 | Keyser-Allen .... | H04W 56/0015 |

\* cited by examiner

*Primary Examiner* — Hee Soo Kim
(74) *Attorney, Agent, or Firm* — Fenwick & West LLP

(57) ABSTRACT

Various client devices include displays and one or more image capture devices configured to capture video data. Different users of an online system are associated with client devices that exchange information captured by their respective image capture devices. When exchanging information, presentation of content to users associated with different client device may be initially synchronized across the client devices. To synchronize content presentation, a client device initiating presentation of the content transmits a request identifying the content and an initial time to other client devices. The initial time is greater than than a maximum return time or latency in a network coupling the client devices and the online system from a time when the request is transmitted. A client device determined to be out of synchronization with one or more other client devices receives a command to modify a rate at which the content is presented to reestablish synchronization.

22 Claims, 3 Drawing Sheets

SYNCHRONIZING PRESENTATION OF CONTENT PRESENTED BY MULTIPLE CLIENT DEVICES

BACKGROUND

This disclosure relates generally to presenting content to a user, and more specifically to synchronizing content presented by multiple client devices.

Increasingly, client devices, online systems, and networks allow users to exchange larger amounts of content with each other. For example, an online system allows its users to exchange video data captured by different users via client devices associated with the user. In a specific example, an online system may establish video messaging between a user and an additional user, allowing the users to exchange video data captured by their respective client devices in real-time or in near real-time.

In addition to allowing users to exchange video data for real-time or near-real time communication, an online system coupled to various client devices allows its users to share content items among different client devices. For example, a user associated with a client device identifies a content item to the online system and identifies other client devices, so the content item is presented by the identified content items as well as by the client device associated with the user. As an example, while various client devices exchange video data with each other, a user associated with the client device identifies a song to the online system, which provides the song to the other client devices for presentation. This allows the song to be presented to various users associated with the client devices that are exchanging video data.

However, different characteristics of different content items affect presentation of a content item by different client devices. For example, different types of connections to a network by different client devices cause the different client devices to receive the content item at different rates, which causes different client devices to present different portions of the content item at a particular time. As another example, different client devices connect to a network through connections having different bandwidths, causing the different client devices to receive the content item at different rates. Such discrepancies in receiving the content item by different client devices cause the client devices to present different portions of the content item, preventing users associated with different content items from viewing a common portion of the content item at a specific time.

SUMMARY

Various client devices associated with users of an online system include one or more image capture devices. An image capture device included in a client device is configured to capture video data of a local area surrounding the client device. In various embodiments, video or image data captured by an image capture device of a client device is communicated to an online system coupled to the client device via a network. The online system provides the video or image data to other client devices via the network, and the other client devices present the image or video data.

Additionally, the online system allows a content item to be shared among various client devices so presentation of the content item is synchronized across the various client devices. To share the content item across various client devices, an initiating user associated with an initiating client device transmits a request identifying the content item and identifying one or more receiving users of the online system. For example, the request includes an identifier corresponding to the content item and usernames used by the online system to identify the receiving users. Additionally, the request includes an indication that presentation of the content item is to be synchronized across multiple client devices For example, the request includes a field having a specific value specifying presentation of the content item is to be synchronized across multiple client devices.

The online system stores a time when the request was received and identifies receiving client devices associated with the receiving users. For example, the online system retrieves information identifying receiving client devices included in user profiles maintained by the online system for the receiving users. Alternatively, the request includes information identifying the receiving client devices, and the online system retrieves the information identifying the receiving client devices from the request. The online system determines the time when the request was received based on a clock maintained by the online system; hence the online system 140 stores a time from the clock maintained by the online system when the request was received in association with the request.

Because the online system communicates with each receiving client device and with the initiating client device via one or more networks, characteristics of the one or more networks or characteristics of connections between the initiating client device or the one or more receiving client devices and the one or more networks affect communication of content between the online system and the initiating client device or between the online system and different receiving client devices. For example, connections between different receiving client devices and a network have different bandwidths, causing transmission of content from the online system to different receiving client devices to take different amounts of time. As another example, different receiving client devices and a network have different connection strengths to a network, causing transmission of content from the online system to different receiving client devices to take different amounts of time.

To offset the difference in transmission times between the online system and different receiving client devices, as well as between the online system and the initiating client device, the online system determines a round trip communication time between the online system and the initiating client device. In various embodiments, the online system transmits a message to the initiating client device and stores a time when the online system transmitted the message. When the online system subsequently receives a response to the message from the initiating client device, the online system determines the round trip communication time as a difference between a time when the online system received the response from the initiating client device and the time when the online system transmitted the message to the initiating client device. Similarly, the online system determines round trip communication times between the online system and each receiving client device. In various embodiments, the online system determines the round trip communication times between the online system and the initiating client device and the receiving client devices using any suitable method or methods.

From the round trip communication times between the online system and the initiating client device and between the online system and the receiving client devices, the online system selects a longest round trip communication time. This allows the online system to identify the longest delay in providing content to the initiating client device and to different receiving client devices. Based on the longest round trip communication time, the online system determines an initial time for presentation of the content item and transmits the content item to the initiating client device and to each receiving client device. To determine the initial time, the online system accesses the clock maintained by the online system and adds the longest round trip communication time (or a value greater than the longest round trip communication time) to a current time from the clock maintained by the online system. Accordingly, the initial time is at least the longest round trip communication time from a time when the online system received the request from the initiating client device. Determining the initial time from the longest round trip communication time allows the online system to account for different amounts of time to transmit the content item or a portion of the content item to each of the initiating client device and the one or more receiving client devices. Additionally, using the clock maintained by the online system to determine the initial time prevents potential discrepancies in clocks maintained by the initiating client device and by each of the receiving client devices when presenting the content item.

When transmitting the content item to the initiating client device and to the one or more receiving client devices, the online system also transmits an instruction to the initiating client device and to the receiving client devices to begin presenting the content item at the initial time. This allows the initiating client device and the receiving client devices to each receive the content item (or to each receive a portion of the content item) before beginning presentation of the content item. Transmitting the instruction to present the content item at the initial time along with the content item allows the online system to synchronize presentation of the content item at a time when the initiating client device and each receiving client device have received the content item or have received at least a portion of the content item from the online system. Thus, when a clock maintained by the initiating client device reaches the initial time, the initiating client device presents the content item; similarly, when a clock maintained by a receiving client device reaches the initial time, the receiving client device presents the content item.

As the initiating client device and the one or more receiving client devices present the content item, the online system determines a timestamp of content within the content item corresponding to a time of the clock maintained by the online system that is after the initial time and transmits the timestamp in association with the corresponding time of the clock maintained by the online system to the initiating client device and to the one or more receiving client devices. Upon receiving the timestamp within the content item and the time of the clock maintained by the online system, the initiating client device modifies a clock maintained by the initiating client device to match the time received from the online system and determines a difference between a timestamp of content within the content item presented by the initiating client device when the timestamp and the time of the clock maintained by the online system was received by the initiating client device. Based on the determined difference, the initiating client device modifies subsequent presentation of the content item to reduce the distance. For example, if the determined difference indicates the timestamp of content within the content item presented by the initiating client device is earlier than the timestamp received from the online system, the initiating client device increases a rate at which the content item is presented. As another example, if the determined difference indicates the timestamp of content within the content item presented by the initiating client device is later than the timestamp received from the online system, the initiating client device decreases a rate at which the content item is presented. The receiving client devices similarly modify their locally maintained clocks and presentation of the content upon receiving the timestamp within the content item and the time of the clock maintained by the online system.

Additionally, if users interact with the content item during presentation via one or more of the initiating client device or via the receiving client devices, the interaction is provided to the online system, which determines a time when the interaction was received based on the clock maintained by the online system, and transmits a description of the interaction and the determined time to the other client devices of the initiating client device, and the receiving client devices. For example, the online system receives an interaction with the content item from the initiating client device while the initiating client device presents the content item. The online system determines a time when the interaction was received by the online system based on the clock maintained by the online system and transmits a description of the interaction and the determined time to each of the receiving client devices. Based on the description of the interaction, each of the receiving client devices modifies the content item; additionally, based on the determined time received from the online system, each receiving client device modifies the clock maintained by each receiving client device to match the determined time received from the online system. The online system similarly transmits a description of an interaction received from a receiving client device and a time when the interaction was received by the online system to other receiving client devices and to the initiating client device, which each of the other receiving client devices and the initiating client device modifying the content item and locally maintained clocks to match the determined time received from the online system.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
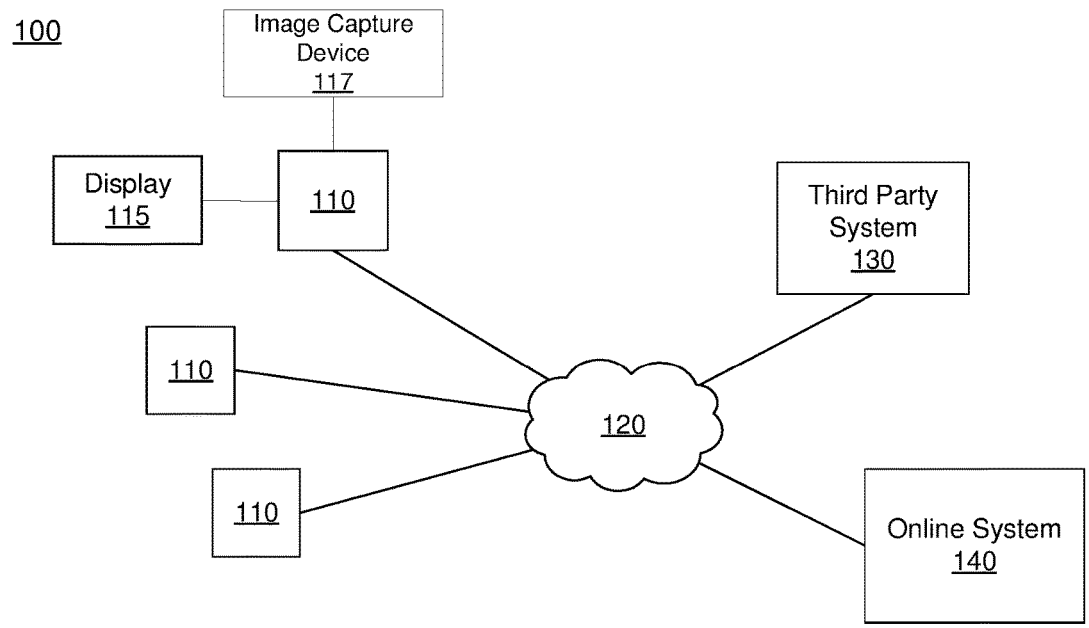
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. Additionally, in the system environment 100 shown by FIG. 1, a controller 117 is coupled to a client device 110. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™. As further described below in conjunction with FIG. 2, a client device 110 includes a display device 115 configured to present content, and one or more image capture devices configured to capture image or video data of a local area surrounding the client device 110.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques. Different client devices 110 are coupled to the network via one or more links, which may have different characteristics (e.g., connection types, bandwidths, signal strengths, etc.).

One or more third party systems 130 may be coupled to the network 120 for communicating with the online system 140, which is further described below in conjunction with FIG. 3. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
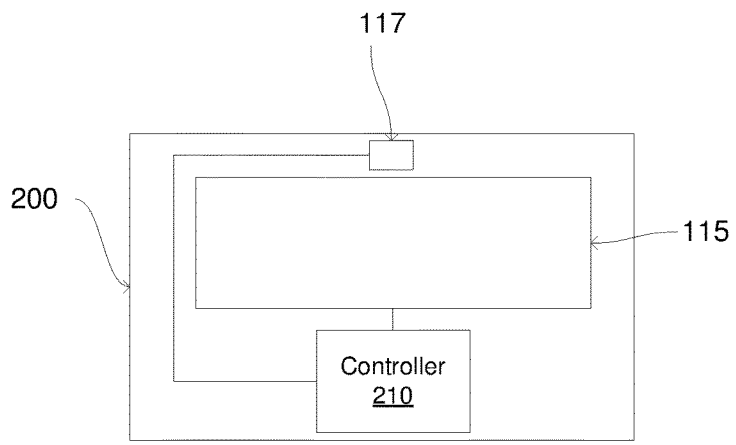
FIG. 2 is a block diagram of a client device, in accordance with an embodiment.

FIG. 2 is a block diagram of an embodiment of a client device 117. In the embodiment shown in FIG. 2, the client device 110 includes a display device 115 and an image capture device 117, as well as a controller 210. However, in other embodiments, the client device 110 includes different or additional components than those shown in FIG. 2.

The display device 115 may be integrated into the client device 110 or coupled to the client device 110. For example, a display device 115 integrated into a client device 110 is a display screen included in the client device 110. Alternatively, the display device 115 is a monitor or other display coupled to the client device 110. The display device 115 presents image data or video data to a user. Image or video data presented by the display device 115 is determined by an application executing on the client device 110. Different applications may be included on the client device 110, so execution of different applications changes the content presented by the user by the display device 115.

The image capture device 117 captures video data or images of a local area surrounding the client device 110 and within a field of view of the image capture device 117. In some embodiments, the image capture device 117 includes one or more cameras, one or more video cameras, or any other device capable of capturing image data or video data. Additionally, the image capture device 117 may include one or more filters (e.g., used to increase signal to noise ratio). Various parameters (e.g., focal length, focus, frame rate, ISO, sensor temperature, shutter speed, aperture, focal point etc.) configure capture of video data or image data by the image capture device 117. Hence, modifying one or more parameters of the image capture device 117 modifies video data or image data captured by the image capture device 117 after modification of the one or more parameters. While FIG. 2 shows a single image capture device 117 included in the client device 110, in other embodiments, the client device 110 includes any suitable number of image capture devices 117.

The controller 210 is coupled to the image capture device 117 and comprises a storage device coupled to a processor. In various embodiments, the controller 210 is also coupled to the display device 115. The controller 210 includes instructions that, when executed by the processor, apply one or more models to video data captured by the image capture device 117. For example, models applied to captured video data by the controller 210 apply one or more rules to characteristics of captured video data to identify objects, people, movement, or any other suitable content of the captured video data. In various embodiments, the controller 210 applies models that locate people in captured video data based on characteristics of the captured video data.

Additionally, the controller 210 maintains a clock or other timing process in various embodiments. The clock determines a time that is stored by the controller 210 or another storage device included in the client device 110. In various embodiments, the clock uses nay suitable method or methods for determining and maintaining a time for the client device 110.

In various embodiments, the client device 110 includes one or more audio capture devices, such as microphones. For example, the client device 110 includes an array of microphones configured for beamforming in two or three dimensions. The audio capture devices capture audio signals from different regions within a local area surrounding the client device 110. In various embodiments, the one or more audio capture devices are coupled to the controller 210, which maintains information identifying different regions of the local area surrounding the client device 110; for example, the controller 210 identifies 24 fifteen degree regions of the local area surrounding the client device 110 originating from a point within the client device 110, identifying regions of a 360 degree local area surrounding the client device 110.

The one or more audio capture devices are coupled to the controller 210, which applies one or more models, such as machine learned models or other sound recognition models, to audio data captured from a region of the local area surrounding the client device 110. The controller 210 includes information identifying users or objects (e.g., a television, a mobile device), and application of the one or more models to audio captured from a region of the local area surrounding the client device 110 determines whether the captured audio data includes audio data from a user or an object identified by the controller 210 or ambient noise. In some embodiments, the one or more models applied by the controller 210 determine a particular user or a particular object identified by the controller 210 from which the one or more audio capture devices captured audio in the region. In other embodiments, the client device 110 communicates audio data captured by one or more audio devices to the online system 140, which applies the one or more models to determine whether the audio data includes audio data captured from an identified object or user or to determine a particular identified user or object from which audio data was captured. The online system 140 provides the client device 110 with an indication of whether the captured audio data includes audio data captured from an identified object or user or provides information specifying a particular identified object or user from which the audio data was captured. The controller 210 or the online system 140 similarly determines whether audio captured from other regions surrounding the local area of the client device 110. Based on determinations of identified objects or users from which audio data in different regions was captured, the controller 210 modifies positioning of one or more audio devices to improve quality of audio captured from one or more regions. For example, the controller 210 repositions one or more audio capture devices to improve quality of audio captured from a region surrounding the local area from which audio data was captured from a specific user or from a specified object. Similarly, the controller 210 may reposition or otherwise modify one or more parameters of the image capture device 117 based on regions of the local area surrounding the client device 110 from which audio data was captured from different users or objects. The one or more audio devices and the image capture device 117 may be directed to different portions of the local area surrounding the client device 110 in various embodiments. For example, the image capture device 117 is directed to an object described by a user, while the controller 210 directs one or more audio capture devices to a region of the local area surrounding the client device 110 from which audio data was captured by a specific user.

Additionally, the controller 210 maintains and enforces one or more privacy settings for users or people identified from captured video data or other data in various embodiments. A privacy setting of a user or person determines how particular information associated with a user or person can be shared, and may be stored in association with information identifying the user or the person. In some embodiments, the controller 210 retrieves privacy settings for one or more users maintained by the online system 140. In one embodiment, a privacy setting specifies particular information associated with a user and identifies other entities with whom the specified information may be shared. Examples of entities with which information can be shared may include other users, applications, third party systems 130 or any entity that can potentially access the information. Examples of information that can be shared by a user include image data including the user or the person, audio data including audio captured from the user or the person, video data including the user or the person, and the like.

In various embodiments, the controller 210 does not identify a user within captured video data, audio data, image data, or other data unless the controller 210 obtains a privacy setting from the user authorizing the controller 210 to identify the user. For example, a privacy setting associated with a user has a default setting preventing the controller 210 from identifying the user, so the controller 210 does not identify the user unless the user manually alters the privacy setting to allow the controller 210 to identify the user. Additionally, an alternative privacy setting regulates transmission of information from the client device 110 identifying the user to another entity (e.g., another client device 110, the online system 140, a third party system 130) in various embodiments. The alternative privacy setting has a default setting preventing transmission of information identifying the user in various embodiments, preventing the controller 210 from transmitting information identifying the user to other entities unless the user manually modifies the alternative privacy setting to authorize transmission). The controller 210 maintains the one or more privacy settings for each user identified from captured video data or other data, allowing user-specific control of transmission and identification of each user. In some embodiments, the controller 210 prompts a person to provide privacy settings when the controller 210 initially identifies the person from captured data and stores the provided privacy settings in association with information identifying the person.

In some embodiments, the controller 210 obtains information maintained by the online system 140 or from one or more third party systems 130 for a user identified from captured video data, subject to privacy settings for the user. Based on video data, audio data, image data, or other data including the user previously captured by the client device 110 and the obtained information, the controller 210 may generate content for presentation to the user via the client device 110. For example, the controller 210 overlays content items from the online system 140 associated with one or more objects identified by the controller 210 from video data or image data captured by the client device 110. Alternatively, the online system 140 generates content for the user based on video data, image data, audio data, or other data including the user received from the client device 110 and information maintained by the online system 140 for the user (or obtained from one or more third party systems 130 by the online system 140) and provides the generated content to the client device 110 for presentation to the user.

Figure 3:
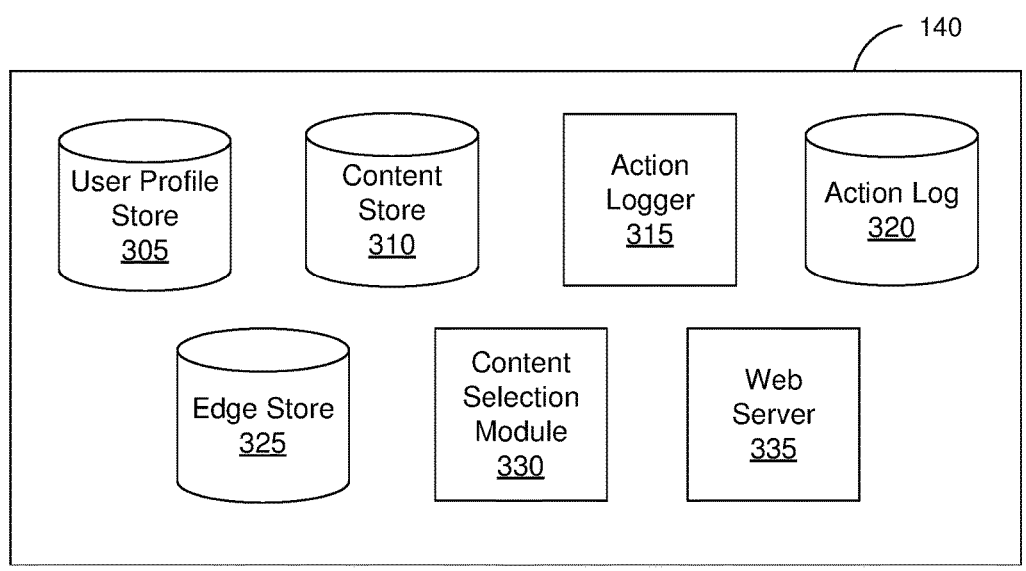
FIG. 3 is a block diagram of an online system, in accordance with an embodiment.

FIG. 3 is a block diagram of an architecture of the online system 140. The online system 140 shown in FIG. 3 includes a user profile store 305, a content store 310, an action logger 315, an action log 320, an edge store 325, a content selection module 330, and a web server 335. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 305. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 305 may also maintain references to actions by the corresponding user performed on content items in the content store 310 and stored in the action log 320.

Additionally, a user profile maintained for a user includes characteristics of one or more client devices 110 associated with the user, allowing the online system 140 to subsequently identify the user from characteristics provided by a client device 110. For example, an application associated with the online system 140 and executing on a client device 110 provides a device identifier or other information uniquely identifying the client device 110 to the online system 140 in association with a user identifier. The online system 110 stores the device identifier or other information uniquely identifying the client device 110 in the user profile maintained for the user, allowing subsequent identification of the user if the online system 140 receives the device identifier or other information uniquely identifying the client device 110. Other characteristics of client devices 110 associated with the user may be alternatively or additionally included in the user profile maintained by the user. For example, the user profile includes a network address used by a client device 110 to access a network 120, an identifier of an application executing on a client device 110 from which the online system 140 received information, a type of the client device 110 (e.g., a manufacturer, an identifier of a model of the client device 110, etc.) from which the online system 140 received information, and an operating system executing on the client device 110 from which the online system 140 received information. However, the online system 140 may store any suitable characteristics of a client device 110 in a user profile, allowing the online system 140 to maintain information about client devices 110 used by the user corresponding to the user profile.

While user profiles in the user profile store 305 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 310 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 310, such as status updates, photos tagged by users to be associated with other objects in the online system 140, events, groups or applications. In some embodiments, objects are received from third-party applications or third-party applications separate from the online system 140. In one embodiment, objects in the content store 310 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 310 include a creative, which is content for presentation to a user, and a bid amount. The creative is text, image, audio, video, or any other suitable data presented to a user. In various embodiments, the creative also specifies a page of content. For example, a content item includes a link that specifying a network address of a landing page of content to which a user is directed when the content item is accessed. If a user presented with the content The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

The action logger 315 receives communications about user actions internal to and/or external to the online system 140, populating the action log 320 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 320.

The action log 320 may be used by the online system 140 to track user actions on the online system 140, as well as actions on third party systems 130 that communicate information to the online system 140. Users may interact with various objects on the online system 140, and information describing these interactions is stored in the action log 320. Examples of interactions with objects include: commenting on posts, sharing links, checking-in to physical locations via a client device 110, accessing content items, and any other suitable interactions. Additional examples of interactions with objects on the online system 140 that are included in the action log 320 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 320 may record a user's interactions with advertisements on the online system 140 as well as with other applications operating on the online system 140. In some embodiments, data from the action log 320 is used to infer interests or preferences of a user, augmenting the interests included in the user's user profile and allowing a more complete understanding of user preferences.

The action log 320 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 320 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 315 by the application for recordation and association with the user in the action log 320.

In one embodiment, the edge store 325 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 325 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 325, in one embodiment. Alternatively, each interaction between a user and a specific object is stored as a separate edge. In some embodiments, connections between users may be stored in the user profile store 305, or the user profile store 305 may access the edge store 325 to determine connections between users.

The content selection module 330 selects one or more content items for communication to a client device 110 to be presented to a user. Content items eligible for presentation to the user are retrieved from the content store 310 or from another source by the content selection module 330, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 330 includes content items eligible for presentation to the user in one or more selection processes, which identify a set of content items for presentation to the user. For example, the content selection module 330 determines measures of relevance of various content items to the user based on attributes associated with the user by the online system 140 and based on the user's affinity for different content items. A measure of relevance of a content item to the user is based on a measure of quality of the content item for the user, which may be based on the creative included in the content item as well as content of a landing page identified by a link in the content item. Based on the measures of relevance, the content selection module 330 selects content items for presentation to the user. As an additional example, the content selection module 330 selects content items having the highest measures of relevance or having at least a threshold measure of relevance for presentation to the user. Alternatively, the content selection module 330 ranks content items based on their associated measures of relevance and selects content items having the highest positions in the ranking or having at least a threshold position in the ranking for presentation to the user.

Content items eligible for presentation to the user may include content items associated with bid amounts. The content selection module 330 uses the bid amounts associated with content items when selecting content for presentation to the user. In various embodiments, the content selection module 330 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item. The content selection module 330 may rank content items based on their associated bid amounts and select content items having at least a threshold position in the ranking for presentation to the user. In some embodiments, the content selection module 330 ranks both content items not associated with bid amounts and content items associated with bid amounts in a unified ranking based on bid amounts and measures of relevance associated with content items. Based on the unified ranking, the content selection module 330 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 330 receives a request to present a feed of content to a user of the online system 140. The feed includes content items such as stories describing actions associated with other online system users connected to the user. The content selection module 330 accesses one or more of the user profile store 305, the content store 310, the action log 320, and the edge store 325 to retrieve information about the user. For example, information describing actions associated with other users connected to the user or other data associated with users connected to the user are retrieved. Content items from the content store 310 are retrieved and analyzed by the content selection module 330 to identify candidate content items eligible for presentation to the user. For example, content items associated with users who not connected to the user or stories associated with users for whom the user has less than a threshold affinity are discarded as candidate content items. Based on various criteria, the content selection module 330 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 330 presents content to a user through a feed including a plurality of content items selected for presentation to the user. The content selection module 330 may also determine the order in which selected content items are presented via the feed. For example, the content selection module 330 orders content items in the feed based on likelihoods of the user interacting with various content items.

The content selection module 330 receives video data captured by an image capture device 117 included in a client device 110 associated with a user of the online system and transmits the video data to a receiving client device 110 for presentation to a receiving user via a display device 115. The online system 140 may receive a request from the client device 110 that identifies the receiving user, and subsequently provides video data from the client device 110 to the receiving client device 110 in response to receiving an authorization from the receiving user. Conversely, the online system 140 receives a request from the receiving user via the receiving client device 110 and subsequently provides video data received from the client device 110 to the receiving client device 110 in response to receiving an authorization from the user. This allows different users of the online system 140 to exchange video data captured by client devices 110 associated with the users via the online system 140.

Additionally, a user may provide a request to the online system 140 to provide a content item to a client device 110 associated with the viewing user as well as client devices 110 associated with one or more receiving users. The content item may be retrieved from the content store 310 or may be included in the request. In various embodiments, the request indicates that presentation of the content item by the client device 110 and by the receiving client devices 110 is synchronized, allowing users associated with different client devices 110 to view a common portion of the content item at a specific time. To synchronize presentation of the content item by the client device 110 and by the receiving client devices 110, the content selection module 330 determines round trip communication times to communicate between the online system 140 and each receiving client device 110 and the client device 110, as further described below in conjunction with FIG. 4. Based on the determined round trip communication times, the content selection module 330 determines an initial time for the client device 110 and the receiving client devices 110 to being presenting the content item. In various embodiments, the content selection module 330 determines the initial time by adding a longest determined round trip communication time to a time when the online system 140 received the request, determined from a clock maintained by the online system 140. As further described below in conjunction with FIG. 4, the content selection module 330 transmits the content item to the client device 110 and to the receiving client devices 110 along with an instruction to present the content item at the initial time. Additionally, as further described below in conjunction with FIG. 4, the content selection module 330 may periodically transmit a timestamp of content within the content item and a time maintained by the online system 140 corresponding to the timestamp to the receiving client devices 110 and to the client device 110; the client device 110 and the receiving client devices 110 modify locally maintained clocks to match the time maintained by the online system 140 and modify presentation of the content item based on differences between timestamps of the content item presented by the client device 110 and by the receiving client device 110 and the timestamps received from the online system 140.

The content selection module 330 enforces one or more privacy settings of the users of the online system 140 in various embodiments. A privacy setting of a user determines how particular information associated with a user can be shared, and may be stored in the user profile of a user in the user profile store 305. In one embodiment, a privacy setting specifies particular information associated with a user and identifies other entities with whom the specified information may be shared. Examples of entities with which information can be shared may include other users, applications, third party systems 130 or any entity that can potentially access the information. Examples of information that can be shared by a user include user profile information like profile photo, phone numbers associated with the user, user's connections video data including the user, actions taken by the user such as adding a connection, changing user profile information and the like. In various embodiments, the online system 140 maintains privacy settings associated with a user having a default setting preventing other entities from accessing or receiving content associated with the user, and allows the user to modify different privacy settings to allow other entities that are specified by the user to access or to retrieve content corresponding to the modified privacy settings.

The privacy setting specification may be provided at different levels of granularity. In one embodiment, a privacy setting may identify specific information to be shared with other users. For example, the privacy setting identifies a work phone number or a specific set of related information, such as, personal information including profile photo, home phone number, and status. Alternatively, the privacy setting may apply to all the information associated with the user.

Specification of the set of entities that can access particular information may also be specified at various levels of granularity. Various sets of entities with which information can be shared may include, for example, all users connected to the user, a set of users connected to the user, additional users connected to users connected to the user all applications, all third party systems 130, specific third party systems 130, or all external systems.

One embodiment uses an enumeration of entities to specify the entities allowed to access identified information or to identify types of information presented to different entities. For example, the user may specify types of actions that are communicated to other users or communicated to a specified group of users. Alternatively, the user may specify types of actions or other information that is not published or presented to other users.

The content selection module 330 includes logic to determine if certain information associated with a user can be accessed by other users connected to the user via the online system 140, third-party system 130 and/or other applications and entities. Based on the user's privacy settings, the content selection module 330 determines if another user, a third-party system 130, an application or another entity is allowed to access information associated with the user, including information about actions taken by the user. For example, the content section module 230 uses a user's privacy setting to determine if video data including the user may be presented to another user. This enables a user's privacy setting to specify which other users, or other entities, are allowed to receive data about the user's actions or other data associated with the user.

The web server 335 links the online system 140 via the network 120 to the one or more client devices 110, as well as to the one or more third party systems 130. The web server 335 serves web pages, as well as other content, such as JAVA®, FLASH®, XML and so forth. The web server 335 may receive and route messages between the online system 140 and the client device 110, for example, instant messages, queued messages (e.g., email), text messages, short message service (SMS) messages, or messages sent using any other suitable messaging technique. A user may send a request to the web server 335 to upload information (e.g., images or videos) that are stored in the content store 310. Additionally, the web server 335 may provide application programming interface (API) functionality to send data directly to native client device operating systems, such as IOS®, ANDROID™, or BlackberryOS.

Synchronizing Presentation of Content Across Multiple Client Devices

Figure 4:
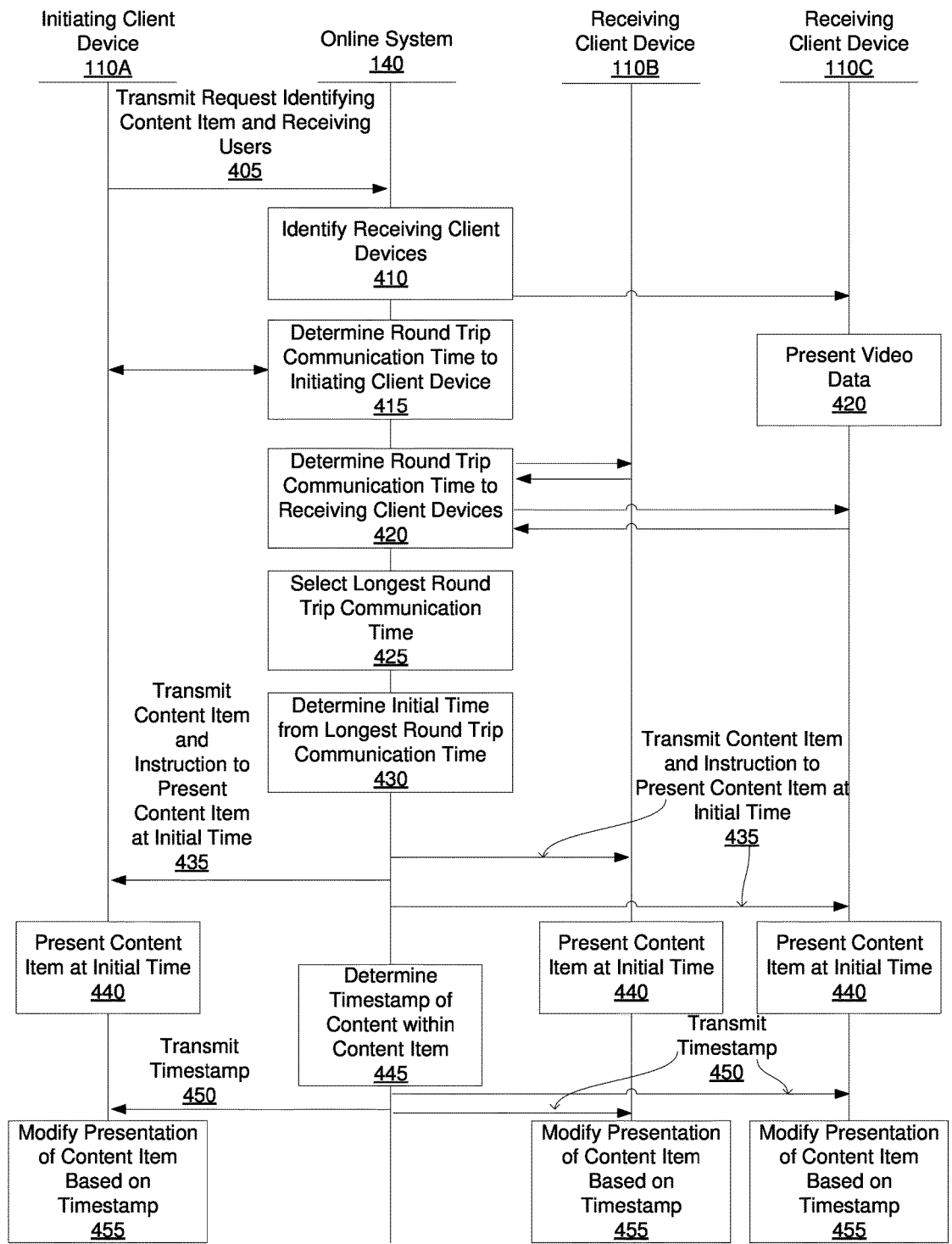
FIG. 4 is an interaction diagram of a method for synchronizing presentation of a content item across multiple client devices, in accordance with an embodiment.

FIG. 4 is an interaction diagram of one embodiment of a method for synchronizing presentation of a content item across multiple client devices 110. In various embodiments, the steps described in conjunction with FIG. 4 may be performed in different orders. Additionally, in some embodiments, the method may include different and/or additional steps than those shown in FIG. 4.

An initiating client device 110A and one or more receiving client devices 110B, 110C are coupled to an online system 140 via one or more networks 120, as further described above in conjunction with FIG. 1. The initiating client device 110A and the receiving client devices 110B, 110C include one or more image capture devices 117 and a display 115, as further described above in conjunction with FIGS. 1 and 2. An image capture device 117 included in the initiating client device 110A captures video data or image data of a local area surrounding the initiating client device 110A. Similarly, an image capture device 117 include in a receiving client device 110B, 110C captures image or video data of a local area surrounding the receiving client device 110B, 110C. In various embodiments, video or image data captured by the image capture device 117 of the initiating client device 110A or audio data captured by the initiating client device 110A is communicated to the online system 140, which transmits the video or image data to the one or more receiving client devices 110B, 110C, which display the video or image data via a display device 115 or present audio data via any suitable component. Similarly, video or image data captured by image capture devices 117 of a receiving client device 110B, 110C or audio data captured by the receiving client device 110B may be communicated to the online system 140, which transmits the image or video data, or the audio data, to the initiating client device 110A or to another receiving client device 110B, 110C for presentation by a display device 115 or other suitable component.

An initiating user associated with the initiating client device 110A may also share a content item maintained by the online system 140, or otherwise accessible by the online system 140 (e.g., stored on the initiating client device 110A and capable of being retrieved by the online system 140) with the receiving client devices 110B, 110C. When sharing the content item between the initiating client device 110A and the one or more receiving client devices 110B, 110C, the initiating user may specify that presentation of the content item by the initiating client device 110A and the receiving client devices 110B, 110C is synchronized. For example, the content item shred by the initiating user is a video, so synchronizing presentation of the video causes the initiating client device 110A and the receiving client devices 110B, 110C to begin playing the video at a common time. As another example, the content item shred by the initiating user is a song or other audio data, so synchronizing presentation of the video causes the initiating client device 110A and the receiving client devices 110B, 110C to begin playing the video at a common time. In various embodiments, the initiating user shares the content item while the initiating client device 110A exchanges data with one or more receiving client devices 110B, 110C. For example, the initiating client device 110A transmits video data captured by an image capture device 117 to the online system 140 for transmission to one or more receiving client devices 110B, 110C and receives video data from the online system 140 captured by image capture devices 117 of one or more receiving client devices 110B, 110C; the initiating user subsequently identifies a content item to the online system 140 for sharing between the initiating client device 110A and one or more receiving client devices 110B, 110C. As an example, the initiating user accesses an interface presented by the display device 115 of the initiating client device 110A, selects the content item, and specifies that presentation of the content item is to be synchronized between the initiating client device 110A and the one or more receiving client devices 110B, 110C. In another example, the content item is locally stored by each of the initiating client device 110A and the receiving client devices 110B, 110C and is identified to the online system 140 along with a specification that presentation of the content item by the initiating client device 110A and the receiving client devices 110B, 110C is to be synchronized.

To synchronize presentation of a content item between the initiating client device 110A and the one or more receiving client devices 110B, 110C, the initiating client device 110A transmits 405 a request identifying the content item and identifying one or more receiving users of the online system 140. For example, the request includes an identifier corresponding to the content item and usernames used by the online system 140 to identify the receiving users. Additionally, the request includes an indication that presentation of the content item is to be synchronized across multiple client devices 110. For example, the request includes a field having a specific value specifying presentation of the content item is to be synchronized across multiple client devices 110.

When the online system 140 receives the request from the initiating client device 110A, the online system 140 stores a time when the request was received and identifies 410 the receiving client devices 110B, 110C associated with the receiving users. For example, the online system 140 retrieves user profiles corresponding to information identifying the receiving users and identifies 410 the receiving client devices 110B, 110C from information in the retrieved user profiles identifying client devices 110 associated with the receiving users. Alternatively, the online system 140 retrieves information for identifying the receiving client devices 110B, 110C from the received request. For example, the request includes information for providing information to the receiving client devices 110B, 110C, such as a phone number, a device identifier, or a network address associated with each receiving client device 110B, 110C. The online system 140 determines the time when the request was received based on an clock maintained by the online system 140, hence the online system 140 stores a time from the clock maintained by the online system 140 when the request was received in association with the request.

As the online system 140 communicates with each receiving client device 110B, 110C and with the initiating client device 110A via one or more networks 120, characteristics of the one or more networks 120 or characteristics of connections between the initiating client device 110A or the one or more receiving client devices 110B, 110C and the one or more networks 120 affect communication of content between the online system 140 and the initiating client device 110A or between the online system 140 and different receiving client devices 110B, 110C. For example, connections between different receiving client devices 110B, 110C and a network 120 have different bandwidths, causing transmission of content from the online system to different receiving client devices 110B, 110C to take different amounts of time. As another example, different receiving client devices 110B, 110C and a network 120 have different connection strengths to a network, causing transmission of content from the online system to different receiving client devices 110B, 110C to take different amounts of time.

To offset the difference in transmission times between the online system 140 and different receiving client devices 110B, 110C, as well as between the online system 140 and the initiating client device 110A, the online system 140 determines 415 a round trip communication time between the online system 140 and the initiating client device 110A. In various embodiments, the online system 140 transmits a message to the initiating client device 110A and stores a time when the online system 140 transmitted the message. When the online system 140 subsequently receives a response to the message from the initiating client device 110A, the online system 140 determines 415 the round trip communication time as a difference between a time when the online system 140 received the response from the initiating client device 110A and the time when the online system 140 transmitted the message to the initiating client device 110A. In various embodiments, the online system 140 determines 415 the round trip communication time between the online system 140 and the initiating client device 110A using any suitable method or methods.

Similarly, the online system 140 determines 420 additional round trip communication times between the online system 140 and each of the receiving client devices 110B, 110C. In various embodiments, the online system 140 transmits a message to a receiving client device 110B, 110C and stores a time when the online system 140 transmitted the message. When the online system 140 subsequently receives a response to the message from the receiving client device 110A, 110B, the online system 140 determines 420 the round trip communication time as a difference between a time when the online system 140 received the response from the receiving client device 110B, 110C and the time when the online system 140 transmitted the message to the receiving client device 110B, 110C. The online system 140 determines 420 an additional round trip communication time between the online system 140 and each receiving client device 110B, 110C identified from the received request. In various embodiments, the online system 140 determines 415 the round trip communication time between the online system 140 and each receiving client device 110B, 110C using any suitable method or methods.

From the round trip communication time between the online system 140 and the initiating client device 110A and the additional round trip communication times between the online system 140 and the receiving client devices 110B, 110C, the online system selects 425 a longest round trip communication time. This allows the online system 140 to identify the longest delay in providing content to the initiating client device 110A and to different receiving client devices 110B, 110C. Based on the longest round trip communication time, the online system 140 determines 430 an initial time for presentation of the content item and transmits 435 the content item to the initiating client device 110A and to each receiving client device 110B, 110C. To determine 430 the initial time, the online system 140 accesses a clock maintained by the online system 140 and adds the longest round trip communication time (or a value greater than the longest round trip communication time) to a current time from the clock maintained by the online system. The initial time is at least the longest round trip communication time from a time when the online system 140 received the request from the initiating client device 110A. Hence, specifying the initial time as at least the longest round trip communication time allows the online system 140 to account for different amounts of time to transmit 435 the content item or a portion of the content item to each of the initiating client device 110A and the one or more receiving client devices 110B, 110C. Additionally, using the clock maintained by the online system 140 to determine the initial time prevents potential discrepancies in clocks maintained by the initiating client device 110A and by each of the receiving client devices 110B, 110C when presenting the content item.

When transmitting 435 the content item to the initiating client device 110A and to the one or more receiving client devices 110B, 110C, the online system 140 also transmits an instruction to begin presenting the content item at the initial time. This allows the initiating client device 110A and the receiving client devices 110B, 110C to each receive the content item (or to each receive a portion of the content item) before beginning presentation of the content item. Transmitting the instruction to present the content item at the initial time along with the content item allows the online system 140 to synchronize presentation of the content item at a time when the initiating client device 110A and each receiving client device 110B, 110C have received the content item or have received at least a portion of the content item from the online system 140. When a clock maintained by the initiating client device 110A reaches the initial time, the initiating client device 110A presents 440 the content item; similarly, when a clock maintained by a receiving client device 110B, 110C reaches the initial time, the receiving client device 110B, 110C presents 435 the content item.

As the initiating client device 110A and the one or more receiving client devices 110B, 110C present 440 the content item, the online system 140 determines 445 a timestamp of content within the content item corresponding to a time of the clock maintained by the online system 140 that is after the initial time and transmits 450 the timestamp in association with the corresponding time of the clock maintained by the online system 140 to the initiating client device 110A and to the one or more receiving client devices 110B, 110C. In various embodiments, the online system 140 determines 440 the timestamp within the content item and the corresponding time of the clock maintained by the online system 140 at a periodic interval, so the online system 140 periodically transmits 450 a timestamp within the content item and the corresponding time of the clock maintained by the online system 140 to the initiating client device 110A and to the receiving client device 110B. Upon receiving the timestamp within the content item and the time of the clock maintained by the online system 140, the initiating client device 110A modifies a clock maintained by the initiating client device 110A to match the time received from the online system 140 and determines a difference between a timestamp of content within the content item presented by the initiating client device 110A when the timestamp and the time of the clock maintained by the online system 140 was received by the initiating client device 110A. Based on the determined difference, the initiating client device 110A modifies 455 subsequent presentation of the content item to reduce the distance. For example, if the determined difference indicates the timestamp of content within the content item presented by the initiating client device 110A is earlier than the timestamp received from the online system 140, the initiating client device 110A increases a rate at which the content item is presented. As another example, if the determined difference indicates the timestamp of content within the content item presented by the initiating client device 110A is later than the timestamp received from the online system 140, the initiating client device 110A decreases a rate at which the content item is presented.

Similarly, when each receiving client device 110B, 110C receives the timestamp within the content item and the time of the clock maintained by the online system 140, a receiving client device 110B, 110C modifies a clock maintained by the receiving client device 110B, 110C to match the time received from the online system 140 and determines a difference between a timestamp of content within the content item presented by the receiving client device 110B, 110C when the timestamp and the time of the clock maintained by the online system 140 was received by the receiving client device 110B, 110C. Based on the determined difference, the receiving client device 110B, 110C modifies 455 subsequent presentation of the content item to reduce the distance. For example, if the determined difference indicates the timestamp of content within the content item presented by the receiving client device 110B, 110C is earlier than the timestamp received from the online system 140, the receiving client device 110B, 110C increases a rate at which the content item is presented. As another example, if the determined difference indicates the timestamp of content within the content item presented by the receiving client device 110B, 110C is later than the timestamp received from the online system 140, the receiving client device 110B, 110C decreases a rate at which the content item is presented.

Additionally, if users interact with the content item during presentation via one or more of the initiating client device 110A or the receiving client devices 110B, 110C, the online system 140, the interaction is provided to the online system 140, which determines a time when the interaction was received based on the clock maintained by the online system 140, and transmits a description of the interaction and the determined time to the other client devices 110 of the initiating client device 110A, and the receiving client devices 110B, 110C. For example, the online system 140 receives an interaction with the content item from the initiating client device 110A while the initiating client device 110A presents 435 the content item. The online system 140 determines a time when the interaction was received by the online system 140 based on the clock maintained by the online system 140 and transmits a description of the interaction and the determined time to each of the receiving client devices 110B, 110C. Based on the description of the interaction, each of the receiving client devices 110B, 110C modifies the content item; additionally, based on the determined time received from the online system 140, each receiving client device 110B, 110C modifies the clock maintained by each receiving client device 110B, 110C to match the determined time received from the online system 140. Similarly, when the online system 140 receives an interaction with the content item from a receiving client device 110B, 110C while the receiving client device 110B, 110C presents 435 the content item. The online system 140 determines a time when the interaction was received by the online system 140 based on the clock maintained by the online system 140 and transmits a description of the interaction and the determined time to the initiating client device 110A and to each of the other receiving client devices 110B, 110C. Based on the description of the interaction, each of the receiving client devices 110B, 110C and the initiating client device 110A modifies the content item; additionally, based on the determined time received from the online system 140, each of the other receiving client devices 110B, 110C and the initiating client device 110A modifies the clock maintained by the other receiving client devices 110B, 110C and the initiating client device 110A to match the determined time received from the online system 140.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, at an online system, a request from an initiating client device associated with an initiating user of the online system identifying a content item and one or more receiving users of the online system;
   identifying receiving client devices for the receiving users, each receiving client device associated with a receiving user;
   determining a round trip communication time between the initiating client device and the online system;
   determining round trip communication times between each receiving client device and the online system;
   selecting a longest round trip communication time of the round trip communication time between the initiating client device and the online system and the round trip communication times between each receiving client device and the online system;
   determining an initial time for presenting the content item that is at least the maximum round trip communication time from a time when the online system received the request, the initial time determined from a clock maintained by the online system; and
   transmitting the content item to the initiating client device and to each of the one or more receiving client devices along with an instruction to present the content item at the initial time.

2. The method of claim 1, wherein each receiving client device is exchanging information with the imitating client device.

3. The method of claim 2, wherein each receiving client device is exchanging video data with the initiating client device.

4. The method of claim 1, further comprising:
   determining a timestamp of the content item corresponding to a time of the clock maintained by the online system after the initial time and during presentation of the content item; and
   transmitting the timestamp in association with the time maintained by the online system to the initiating client device and to each of the receiving client devices.

5. The method of claim 1, further comprising:
   receiving, at the online system, an interaction with the content item from a receiving client device while the content item is presented by the receiving client device;
   determining a time when the interaction was received by the online system from the clock maintained by the online system; and
   transmitting the interaction and the determined time from the online system to the initiating client device and to each other receiving client device.

6. The method of claim 1, further comprising:
   receiving, at the online system, an interaction with the content item from the initiating client device while the content item is presented by the initiating client device;
   determining a time when the interaction was received by the online system from the clock maintained by the online system; and
   transmitting the interaction and the determined time from the online system to each of the receiving client devices.

7. A method comprising:
   receiving, at a client device, a content item and an instruction to present the content item at an initial time from an online system, the initial time later than a time when the client device receives the content item and the instruction;
   presenting the content item via a display device of the client device when a clock maintained by the client device reaches the initial time;
   receiving a timestamp of content within the content item and a time maintained by the online system corresponding to the timestamp of content within the content item while the client device is presenting the content item;
   modifying the clock maintained by the client device to match the received time maintained by the online system;
   determining a difference between a timestamp of content within the content item presented by the client device and the timestamp received from the online system; and
   modifying presentation of the content item by the client device based on the determined difference.

8. The method of claim 7, wherein modifying presentation of the content item by the client device based on the determined difference comprises:
   increasing a rate at which the content item is presented by the client device in response to the determined difference indicating the timestamp of content within the content item presented by the client device is earlier than the timestamp received from the online system.

9. The method of claim 7, wherein modifying presentation of the content item by the client device based on the determined difference comprises:
  decreasing a rate at which the content item is presented by the client device in response to the determined difference indicating the timestamp of content within the content item presented by the client device is later than the timestamp received from the online system.

10. The method of claim 7, further comprising:
  receiving an interaction with the content item from a user while the client device is presenting the content item; and
  transmitting a description of the interaction from the client device to the online system.

11. The method of claim 7, further comprising:
  receiving, from the online system. a description of a interaction with the content item received by another client device presenting the content item while the client device is presenting the content item and a time maintained by the online system when the online system received the description of the interaction from the other client device;
  modifying the content item presented by the client device based on the description of the interaction; and
  modifying the clock maintained by the client device to match the time maintained by the online system when the online system received the description of the interaction.

12. The method of claim 7, wherein receiving, at the client device, the content item and the instruction to present the content item at an initial time from an online system comprises:
  capturing video data of a local area surrounding the client device by an image capture device of the client device; and
  receiving the content item and the instruction at the client device while the client device is transmitting the captured video data to the online system.

13. A system comprising:
  an initiating client device;
  one or more receiving client devices;
  an online system coupled to the initiating client device and coupled to the one or more receiving client devices by a network, the online system configured to:
    receive a request from the initiating client device identifying a content item;
    identify the one or more receiving client devices from the request;
    determine a round trip communication time between the initiating client device and the online system;
    determine round trip communication times between each receiving client device and the online system;
    select a longest round trip communication time of the round trip communication time between the initiating client device and the online system and the round trip communication times between each receiving client device and the online system;
    determine an initial time for presenting the content item that is at least the maximum round trip communication time from a time when the online system received the request, the initial time determined from a clock maintained by the online system; and
    transmit the content item to the initiating client device and to each of the one or more receiving client devices along with an instruction to present the content item at the initial time.

14. The system of claim 13, wherein the initiating client device is configured to:
  receive the content item and the instruction to present the content item at the initial time; and
  present the content item via a display device of the initiating client device when a clock maintained by the initiating client device reaches the initial time.

15. The system of claim 13, wherein a receiving client device is configured to:
  receive the content item and the instruction to present the content item at the initial time; and
  present the content item via a display device of the receiving client device when a clock maintained by the receiving client device reaches the initial time.

16. The system of claim 13, wherein the online system is further configured to:
  determine a timestamp of the content item corresponding to a time of the clock maintained by the online system after the initial time and during presentation of the content item by the initiating client device and by the one or more receiving client devices; and
  transmitting the timestamp in association with the time maintained by the online system to the initiating client device and to each of the receiving client devices.

17. The system of claim 16, wherein the initiating client device is configured to:
  receive the timestamp in association with the time maintained by the online system;
  modify the clock maintained by the initiating client device to match the received time maintained by the online system;
  determine a difference between a timestamp of content within the content item presented by the initiating client device and the timestamp received from the online system; and
  modify presentation of the content item by the initiating client device based on the determined difference.

18. The system of claim 17, wherein modify presentation of the content item by the initiating client device based on the determined difference comprises:
  increase a rate at which the content item is presented by the initiating client device in response to the determined difference indicating the timestamp of content within the content item presented by the initiating client device is earlier than the timestamp received from the online system.

19. The method of claim 17, wherein modify presentation of the content item by the initiating client device based on the determined difference comprises:
  decrease a rate at which the content item is presented by the initiating client device in response to the determined difference indicating the timestamp of content within the content item presented by the initiating client device is later than the timestamp received from the online system.

20. The system of claim 16, wherein a receiving client device is configured to:
  receive the timestamp in association with the time maintained by the online system;
  modify the clock maintained by the receiving client device to match the received time maintained by the online system;
  determine a difference between a timestamp of content within the content item presented by the receiving client device and the timestamp received from the online system; and modify presentation of the content item by the receiving client device based on the determined difference.

21. The system of claim 20, wherein modify presentation of the content item by the receiving client device based on the determined difference comprises:

increase a rate at which the content item is presented by the receiving client device in response to the determined difference indicating the timestamp of content within the content item presented by the receiving client device is earlier than the timestamp received from the online system.

22. The method of claim 20, wherein modify presentation of the content item by the initiating client device based on the determined difference comprises:

decrease a rate at which the content item is presented by the receiving client device in response to the determined difference indicating the timestamp of content within the content item presented by the receiving client device is later than the timestamp received from the online system.

* * * * *